(12) United States Patent
Hartmann

(10) Patent No.: US 8,304,008 B2
(45) Date of Patent: *Nov. 6, 2012

(54) FROZEN FILLED YEAST-LEAVENED BREAD PRODUCT AND A METHOD FOR MAKING THE PRODUCT

(75) Inventor: William J. Hartmann, Duluth, MN (US)

(73) Assignee: Bellisio Foods, Inc., Duluth, MN (US)

( * ) Notice: Subject to any disclaimer, the term of this patent is extended or adjusted under 35 U.S.C. 154(b) by 722 days.

This patent is subject to a terminal disclaimer.

(21) Appl. No.: 11/226,016

(22) Filed: Sep. 14, 2005

(65) Prior Publication Data

US 2007/0059413 A1    Mar. 15, 2007

(51) Int. Cl.
*A21D 13/00* (2006.01)
(52) U.S. Cl. ........................ 426/446; 426/283
(58) Field of Classification Search .................. 426/446, 426/448, 95, 283
See application file for complete search history.

(56) References Cited

U.S. PATENT DOCUMENTS

| | | | | |
|---|---|---|---|---|
| 3,065,079 A * | 11/1962 | Elliott | ........................... | 426/296 |
| 3,589,274 A * | 6/1971 | Murray | ........................... | 99/346 |
| 3,611,913 A * | 10/1971 | McGinley | ........................... | 99/349 |
| 3,615,678 A | 10/1971 | Tangel et al. | | |
| 3,646,880 A * | 3/1972 | Norris | ........................... | 99/349 |
| 3,659,517 A * | 5/1972 | Holen | ........................... | 99/355 |
| 3,690,898 A * | 9/1972 | Partyka | ........................... | 426/275 |
| 3,776,124 A * | 12/1973 | Morley | ........................... | 99/335 |
| 4,020,188 A * | 4/1977 | Forkner | ........................... | 426/95 |
| 4,285,979 A * | 8/1981 | Izzi | ........................... | 426/94 |
| 4,297,942 A | 11/1981 | Benson et al. | | |
| 4,784,869 A * | 11/1988 | Bishop | ........................... | 426/523 |
| 5,044,264 A | 9/1991 | Forney | | |
| 5,951,895 A | 9/1999 | Green et al. | | |
| 6,192,789 B1 * | 2/2001 | Agcaoili et al. | ........................... | 99/349 |
| 6,210,723 B1 | 4/2001 | Coleman et al. | | |
| 6,231,898 B1 * | 5/2001 | Perrine | ........................... | 426/94 |
| 6,406,731 B1 * | 6/2002 | Hartman | ........................... | 426/446 |
| 2004/0005391 A1 * | 1/2004 | Shin | ........................... | 426/275 |
| 2004/0040445 A1 * | 3/2004 | Errera | ........................... | 99/388 |
| 2005/0281923 A1 * | 12/2005 | Kubat et al. | ........................... | 426/128 |

FOREIGN PATENT DOCUMENTS

| | | |
|---|---|---|
| EP | 0 053 656 A1 | 6/1982 |
| EP | 1 157 613 A1 | 11/2001 |
| WO | 98/05214 A1 | 2/1998 |

OTHER PUBLICATIONS

European Search Report; dated Apr. 14, 2009; Application No. / Patent No. 06803559.1—1221 / 1933628 PCT/US2006035762.

* cited by examiner

*Primary Examiner* — Jyoti Chawla
(74) *Attorney, Agent, or Firm* — Ladas & Parry LLP

(57) ABSTRACT

A frozen, filled, yeast-bread product and a method for producing the same, the method including coextruding an unrisen yeast-bread dough and a filling through an extruder that is capable of at least encasing the filling with the unrisen yeast-bread dough to form a filled, unrisen yeast-bread dough; shaping the filled, unrisen yeast-bread dough into a consistent flattened shape; proofing, baking, cooling, enrobing, grilling and freezing the filled, unrisen yeast-bread dough to form a frozen, filled, yeast-leavened bread product that experiences substantially no leaking of filling from out of the bread product.

12 Claims, 2 Drawing Sheets

FROZEN FILLED YEAST-LEAVENED BREAD PRODUCT AND A METHOD FOR MAKING THE PRODUCT

BACKGROUND OF THE INVENTION

During the last decade, a dramatic change in consumer eating patterns has been observed. Longer working hours, changing family structures and the pursuit of a healthier lifestyle are all factors that have influenced food purchasing decisions. As a result, consumers typically seek out foods that taste fresh, require minimal preparation time, can be microwaved, are conveniently packaged, and/or are portable.

The use of baking is a food process well known to food manufacturers as a preparation vehicle for foods that meet the aforementioned characteristics. For example, the baking industry which typically manufactures cupcakes, cookies, and bars, has experienced phenomenal growth as consumers now incorporate these baked foods during their eating occasions. In fact, the snack food industry, which originated in the baking industry, is prospering due to the sales of foods that are fresh-tasting, conveniently-packaged and portable. One area of the baking industry that is yet to be fully developed is the creation of high quality hand-held, portable, yeast-leavened bread products, such as hand-held pizzas, sandwiches, or any bread-type product with a topping and/or filling.

The lack of high quality products in this area is due in part to the fact that manufacturing hand-held, yeast-leavened bread products is typically challenging due to a number of variables. For example, yeast-leavened bread products undergo yeast leavening, which is a fermentation process that depends on factors such as yeast viability, temperature, pH, starch concentration, and/or moisture. Controlling each of these factors is difficult, therefore, product quality often varies from one day to the next. Additionally, the incorporation of fillings, such as tomato sauces, cheese sauces, peanut butter, jams, jellies, or creams, into yeast-leavened bread products is also challenging since the filling may leak out from inside of the yeast-leavened bread product, and thus, destroy the overall organoleptic qualities of the yeast-leavened bread product. Inconsistent textural properties within the bread portion is another hurdle that food manufacturers must overcome, especially if application of heat, particularly microwave heat, is required to complete preparation of the yeast-leavened bread product.

Another challenge is to produce a high-quality food product that has a fresh and homemade feel to it, which appeals to the consumers' tastes.

In the past, food manufacturers have incorporated unleavened dough products in dough-based food products, and avoided yeast-leavened bread products. Clearly, there is a need in the baking industry for the manufacture of hand-held, portable, yeast-leavened bread products to meet growing consumer demand.

SUMMARY

The present invention includes a method for producing a frozen, filled, yeast-leavened bread product, such as a frozen, stuffed panini, by co-extruding an unrisen yeast-bread dough and a filling through an extruder that is capable of at least encasing the filling with the unrisen yeast-bread dough to form a filled, unrisen yeast-bread dough; shaping the filled, unrisen yeast-bread dough to eliminate leaking of the filling; proofing, baking, cooling, enrobing, grilling and freezing the filled yeast-bread dough to form a frozen, baked, filled, yeast-leavened bread product. The present invention further includes extruding the unrisen yeast-bread dough through a unique dual nozzle configuration with a shutter adjustment to eliminate substantially all leaking of the filling from out of the frozen, filled, yeast-leavened bread product. The configuration of the nozzle in relation to a conveyor belt allows the filled bread product to be formed in a round, flattened shape. Further flattening is accomplished by passing the filled bread product between two converging conveyor belts.

In a preferred embodiment of the present invention, a bread dough and filling are co-extruded through an extruder and the co-extruded bread dough and filling are pinched off into discrete units in order to form a closed, filled bread dough with substantially no leakage of filling from the bread dough. The filled bread dough is proofed (raised), baked, cooled and enrobed with an oil component in order to form a filled yeast-bread product with an extended interior and exterior shelf life. Before freezing and packaging, the filled bread product may be impressed with grill marks to give the bread product the appearance of being cooked on a grill.

BRIEF DESCRIPTION OF THE DRAWINGS FIGURES

DETAILED DESCRIPTION OF THE PREFERRED EMBODIMENTS

Figure 1:
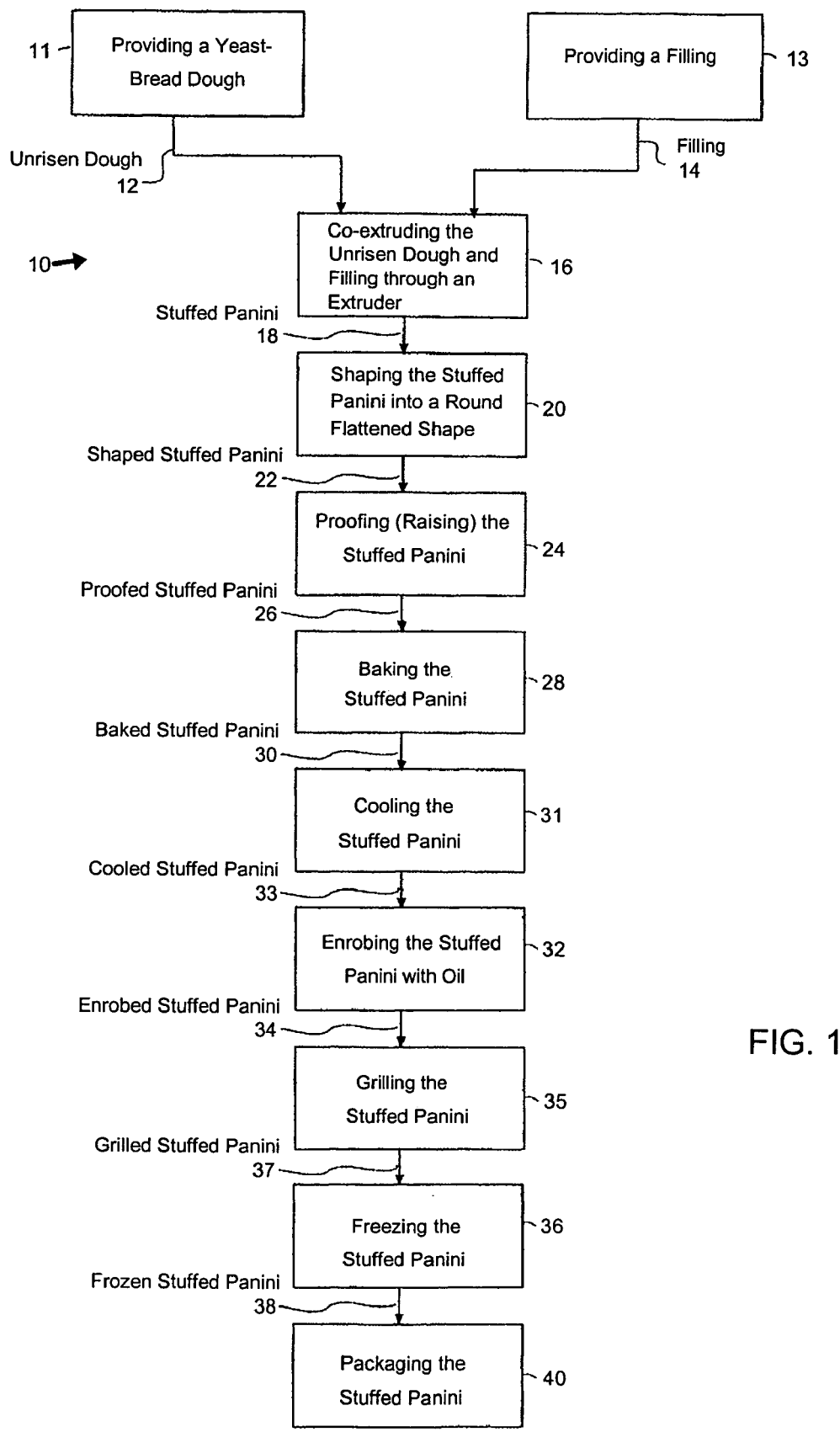
FIG. 1 is a schematic view of a process for producing a frozen, filled, yeast-leavened bread product in accordance with the present invention.

The present invention generally relates to a frozen, filled, yeast-leavened bread product such as a stuffed panini and to a method of making this yeast-leavened bread product. The present invention further relates to a method of extruding a filled, unrisen, yeast bread dough.

A process for producing a frozen, filled, yeast-leavened bread product, which will be described with reference to a frozen stuffed panini 38 for this embodiment, is generally depicted at 10 in FIG. 1. In the process 10, an unrisen yeast bread dough 12, hereinafter referred to as an unrisen dough 12, along with a filling 14 are introduced into an extruder. At 16, the extruder co-extrudes the unrisen dough 12 and the filling 14, encasing the filling 14 within the unrisen dough 12 such that substantially all leaking of the filling 14 is eliminated. The filled unrisen dough 18, which will be referred to as a stuffed panini 18 for this embodiment, is transferred from the extruder 16 to at least one set of rollers that are capable of shaping the stuffed panini 18 into a round, flattened shape at 20.

A shaped stuffed panini 22 is transferred from the rollers to a proofing apparatus at 24 that allows the yeast within the unrisen dough to leaven the shaped stuffed panini 22. A proofed stuffed panini 26 is then transferred from the proofing apparatus to a baking apparatus at 28 that bakes the proofed stuffed panini 26, and transforms the dough into a bread. The baked stuffed panini 30 is then cooled in a cooling apparatus at 31. After cooling at 31, a cooled stuffed panini 33 is transferred from the cooling apparatus to an enrobing apparatus at 32 that enrobes the cooled stuffed panini 30 with an oil or similar ingredient. An enrobed stuffed panini 34 is then transferred to a grilling apparatus at 35 The grilled stuffed panini 37, is then transferred to a freezing apparatus at 36 to reduce the temperature of the grilled stuffed panini 37. A frozen stuffed panini 38 is then discharged from the freezing apparatus. At that time, the frozen stuffed panini 38 may be sent to packaging at 40 to be wrapped.

It has been discovered that preparing a frozen, filled, yeast-leavened bread product in accordance with the present invention results in a completely closed high quality yeast-leavened bread product, such as a stuffed panini sandwich, that has substantially no leaking and that enjoys a long and extended interior and exterior shelf life. Furthermore, the yeast-leavened bread product of the present invention is portable and able to withstand microwave heat when microwave heat is used to prepare the product for consumption. In fact, yeast-leavened bread products of the present invention do not undergo negative textural changes, such as toughening to the bread and/or filling portion, when microwave heat is applied. The flattened panini shape enjoys several advantages such as: faster baking and cooling times which translates into better food quality, more even reheating throughout the food product when microwaved, and better structural stability which allows juicer fillings to be used (such as fruit or with a higher sauce content).

The unrisen dough 12 may include one or more flour component(s), one or more liquid component(s), one or more yeast component(s), one or more fat component(s) and one or more optional additive(s). The components of the unrisen dough 12 may be supplied as individual components, or supplied in various prepared mixtures of two or more components that are subsequently combined to form the unrisen dough 12. Generally, prior to extrusion, the concentration of the flour component(s) in the unrisen dough 12 is at least about 60 weight percent, based on the total weight of the unrisen dough 12; the concentration of the liquid component(s) in the unrisen dough 12 is at least about 30 weight percent, based on the total weight of the unrisen dough 12; the concentration of the yeast component(s) is at least about 1.7 weight percent and more preferably at least about 1.9 weight percent, based on the total weight of the unrisen dough 12; the concentration of the fat component(s) in the unrisen dough 12 is at least about 3 weight percent, based on the total weight of the unrisen dough 12; and the concentration of optional additives may range from about 3.0 weight percent to about 5.0 weight percent, based on the total weight of the unrisen dough 12.

An example of component concentration ranges for a preferred formulation of the unrisen dough 12 is presented in Table 1 below:

TABLE 1

| COMPONENT | CONCENTRATION (weight percent)* |
| --- | --- |
| Flour component | About 55 to about 65 |
| Liquid component | About 26 to about 34 |
| Yeast component | About 1.5 to about 2.5 |
| Fat component | About 2 to about 4 |
| Optional additives | About 3 to about 5 |

*based on the total weight of the unrisen dough 12

In general, any conventional blending and kneading apparatus (not shown), such as the Shaffer horizontal bar mixer available from Horizon Equipment in St. Paul, Minn., Model 302.1, that is suitable for homogeneously blending and kneading the flour component(s), the liquid component(s), the yeast component(s), the fat component(s) and optional additives, such as a dough conditioner, may be used to form the unrisen dough 12 and thereafter transfer the unrisen dough 12 to a hopper at 11. Preferably, the unrisen dough 12 is blended and kneaded for a time sufficient to result in a homogenous dough. If the unrisen dough 12 is blended and kneaded for too long, it will have a gummy consistency. One tool for determining if the unrisen dough 12 has been properly prepared is an amp meter on a dough mixer, such as the amp meter on a Moline spiral mixer. The amp meter may be used to see if a generally consistent product is being prepared from batch to batch. A guideline blending and kneading time of about 2 minutes at a slow speed, followed by about 7:15 minutes at a fast speed may be used. The blending and kneading time for dough development may vary based on the initial concentration of water in each of the ingredients. For instance, variance in the storage environment for the different ingredients may vary the moisture content of those ingredients.

The final dough temperature is preferably about 72° F. to about 78° F. The liquid component temperature may be adjusted to compensate for variations in the flour component temperature to reach the final desired temperature.

The flour component included as part of the unrisen dough 12 may include a variety of different flours. Preferably, the flour component(s) is derived from flours capable of supporting leavening by the yeast, supporting the filling 14, and supporting expansion of the baked stuffed panini 30 exiting the baking apparatus. Some examples of suitable flours that may be incorporated in the unrisen dough 12 include wheat flour, gluten flour, potato flour, cracked wheat, rye flour, buckwheat flour, triticale flour, rice flour, amaranth flour, whole wheat flour, bread flour, all-purpose flour, pastry flour, cake flour, instantized flour, soy flour, corn flour, cornmeal, or any combination of any of these. The flour component may be supplied as an individual flour or by individual flours or by various preparations of two or more flours. Preferably wheat flour, such as the wheat flour manufactured by Pillsbury, is used to practice the present invention.

The liquid component included as part of the unrisen dough 12 is generally liquid water. Liquid water is added to the flour component(s), yeast component(s), fat component(s), and optional additives to form the unrisen dough 12. The amount of liquid water added depends on the initial concentration of water in the yeast component(s), the process feed rate of the unrisen dough 12 through the extruder 16, and the desired final product characteristics of the unrisen dough 12. Preferably, the concentration of water in the unrisen dough 12 ranges from about 26 weight percent to about 34 weight percent, based on the total weight of the unrisen dough 12. More preferably, the concentration of water added to the unrisen dough 12 ranges from about 30 weight percent to about 31 weight percent, based on the total weight of the unrisen dough 12. The moisture content of the unrisen dough 12 affects the taste of the final product and the functionality of the unrisen dough 12.

The yeast component included as part of the unrisen dough 12 may include compressed yeast, active dry yeast, instant quick-rising active dry yeast, liquid yeast, or a starter, or any combination of any of these. As used herein, a starter is a mixture of any liquid, yeast, sugar, and flour to form a thin yeast-containing batter that is at least capable of supporting yeast fermentation for a period of time prior to incorporation into a dough. Generally, when dry yeast, such as compressed yeast, active dry yeast, or instant quick-rising active dry yeast, is included as part of the unrisen dough 12, the dry yeast is re-hydrated in water and subsequently added to the flour component(s), the liquid component(s), the fat component(s) and optional additives. Preferably, Red Star Compressed Yeast or Red Star Yeast Crumbles is the yeast component used to practice the present invention.

The fat component(s) included as part of the unrisen dough 12 may be oil, such as sunflower oil, soybean oil, cottonseed oil, peanut oil, corn oil, safflower oil, olive oil, palm oil, canola oil, margarine, shortening, butter, hydrogenated fats, omega-3 fatty acids, lard, or any of these in any combination. The fat component is typically homogeneously blended into the unrisen dough 12 along with the flour component(s), liquid component(s), yeast component(s) and optional additives. Preferably, olive oil, such as that supplied by All Natural Foods, is used to practice the present invention.

Some non-exhaustive examples of optional additives that may be included in the unrisen dough 12 are salt; sugar; natural and/or artificial flavors; fiber; isoflavones; antioxidants and other nutritional supplements; herbs; spices; colors; dough conditioners; or any combination of any of these. The optional additives may be supplied as individual components or supplied in various prepared mixtures of two or more components that are subsequently combined for incorporation into the unrisen dough 12. Preferably, a dough conditioner such as Paratos S500 is included in the unrisen dough 12. The dough conditioner adds to the overall dough quality and enhances the ability of the final product to withstand microwave heat without toughening.

The filling 14 may include any number of components. The components of the filling 14 may be supplied as individual components or supplied in various prepared mixtures of two or more components that are subsequently combined to form the filling 14. In general, any conventional blending and cooking apparatus that is suitable for homogeneously blending and cooking the filling components (not shown) may be used to form the filling 14 and thereafter transfer the filling 14 into a hopper at 13. It is desirable that the various components of the filling 14 maintain a proper product identity after blending and cooking. For example, if there is a meat component in the filling 14 it may be desirable to cut the meat into pieces large enough that the meat component will maintain a proper product identity throughout the process. Further, it is desirable that a proper combination of filling components is chosen so that the overall moisture content of the filling 14 is not too high. If too many highly moist ingredients are used, spurting of the filling 14 from the final product will occur as a consumer eats the final product, and the filling 14 will taste runny to the consumer. An example of component concentration ranges for a preferred formulation of the filling 14 is present in Table 2 below:

TABLE 2

| COMPONENT | CONCENTRATION (weight percent)* |
| --- | --- |
| Ham component | About 40 to about 50 |
| Cheese Blend component | About 28 to about 36 |
| Cheese Sauce component | About 10 to about 15 |
| Onion component | About 8 to about 12 |
| Misc. Optional Additives | About 1 to about 12 |

*based on the total weight of the filling 14

Figure 2:
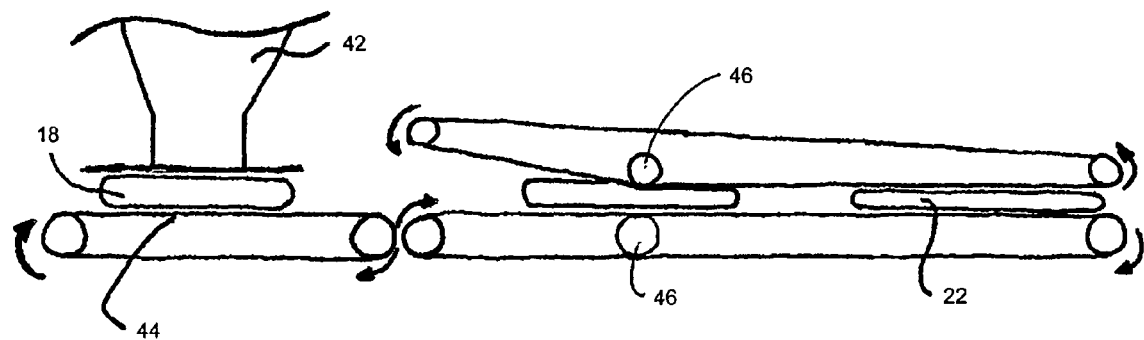
FIG. 2 is a side view of the extruding and shaping apparatus.

At 16, the extruder co-extrudes the unrisen dough 12 and the filling 14, as depicted in FIG. 1, at a dough temperature of about 78° F. to about 84°. The extruder 42 vertically extrudes and encases the filling 14 within the unrisen dough 12. The extruder extrudes the filling 14 and the unrisen dough 12 to form a substantially spherical shape which can then be flattened into a rounded stuffed panini 18. Alternatively, the dual nozzle configuration connected at the discharge end of the extruder 42 can shape the stuffed panini 18 as the stuffed panini 18 exits the extruder 42. One suitable example of the extruder is the Rheon®2 Head Cornucopia Encruster Machine that is available from Rheon USA of Irvine, Calif. This type of extruder has a three-speed mix adjustment that allows compensation for changes in the rheological profile of the unrisen dough portion of the stuffed panini during extrusion. As shown in FIG. 2, by locating the discharge end of the extruder 42 close to the forming surface 44, the stuffed panini 18 formed therebetween will form in a flattened-circular shape instead of as a spherical shape. A flattened-oval shape may also be obtained by moving the forming surface 44 in a transverse direction relative to the extruder 42 as the unrisen dough 12 and filling 14 are being extruded. Preforming the stuffed panini 18 between the extruder 42 and the forming surface 44 requires less shaping to be subsequently performed. Less shaping allows a greater range of dough to be used, such as those having lower gluton levels like whole wheat.

The use of the dual nozzle configuration in the present invention maximizes dough expansion, while eliminating substantially all leaking of the filling from out of the unrisen dough 12. The dual nozzle configuration preferably has an extruding ratio of about 34 millimeters to about 36 millimeters of filling 14 to about 14 millimeters to about 16 millimeters of unrisen dough 12, for a panini having a 4.5" diameter. There are no particular limits on the overall size of the stuffed panini 18. Nonetheless, the stuffed panini 18 preferably has about 40-65 weight percent filling 14 to about 60-35 weight percent unrisen dough 12, more preferably about 55 weight percent filling 14 to about 45 weight percent unrisen dough 12. The ratio of filling 14 to unrisen dough 12 affects not only the taste of the final product, but also the functionality of the product. For example, if there is too much filling 14 in relation to the amount of unrisen dough 12, leaking of the filling 14 out of the final product may occur, especially if the filling 14 includes larger pieces of food, such as meat, within the filling 14. Leaking of the filling 14 out of the product is undesirable for a number of reasons including that the overall net weight of the final product will be reduced resulting in an inconsistent product size, the product will be messier to eat, and the product will look less desirable to consumers.

The stuffed panini 18 exits the dual nozzle configuration connected at the discharge end of the extruder 42 through a shutter adjustment (not shown), such as an iris diaphragm, that cuts or pinches the stuffed panini 18 at a designated length. It has been discovered that the iris diaphragm, when used to cut the stuffed panini 18, is capable of at least pushing the filling 14 that is vertically placed within the unrisen dough 12 away from the edges of the unrisen dough 12 to eliminate leaking of the filling 14. The iris diaphragm is also capable of pinching the edges of the unrisen dough 12 together to further prevent leakage of the filling 14 from out of the unrisen dough 12 and to form a closed, seamless stuffed panini.

The stuffed panini 18 is transferred from the extruder 42 to at least one set of roller(s) and/or conveyor belts 46 at 20, as depicted in FIG. 1, to further shape the stuffed panini 18, as shown in FIG. 2. The rollers of the conveyor belt 46 converge to flatten the stuffed panini 18. The stuffed panini 18 is then transferred from the conveyor belt 46 to a proofing apparatus at 24.

As used herein, a proofing apparatus, such as a Baxter Proofer, is an apparatus that is at least capable of supporting yeast fermentation sufficient to leaven the unrisen dough. The proofing apparatus is preferably operated for about 20-35 minutes at a temperature of about 100° F. to about 105° F. at about 60-75% humidity to sufficiently leaven the unrisen dough 12 and form a filled proofed dough 26. The humidity level and temperature level used while proofing substantially affects the moisture level of the final product. In general, any conventional apparatus and technique that is suitable for transferring dough, such as a conveyor belt, may be used to transfer the stuffed panini 18 from the extruder 16 to the rollers and/or conveyor belts 46 for shaping at 20, and from the rollers and/or conveyor belts 42 to the proofing apparatus for proofing at 24.

Proofing 24 aerates the dough of the product. This aeration in combination with the dough conditioners used to make the dough, enable the final product to be heated by a consumer without causing the product to toughen while heating. An aerated product offers a more desirable taste to the consumer. The aeration also helps the final product to enjoy a longer interior shelf life. Proofing 24 further enhances the overall color of the final product and the size of the final product. The length of time that the product is proofed is important so that no bursting or air bubbles form in the product when it is heated. The liquidity inherent in the ingredients that make up the filling may cause gas formation upon heating. If the dough is underproofed it does not acquire enough elasticity to expand when gas formation occurs. Thus, leakage of the filling may occur. Further, if the dough is overproofed, the final product may not fit in standard sized packaging for the product. Overproofing may also cause leakage because it may cause the dough to overexpand and experience bursting.

The filled proofed dough 26 is transferred from the proofing apparatus to a baking apparatus at 28 that increases the temperature of, and reduces the moisture content of the filled proofed dough 26 to form a baked stuffed panini 30. The baking apparatus may be any conventional baking apparatus that is suitable for baking a yeast-leavened bread product. One suitable example of the baking apparatus is a Baxter Convection Oven, such as the Revent Rotating Rack Oven, that is available from Horizon Equipment of St. Paul, Minn. This oven may be adjusted to divert air flow to allow for uniform baking. The baking apparatus is operated at a temperature of about 450° F. to about 500° F. for about 6 to about 8 minutes.

In another preferred embodiment, steam may be injected into the baking apparatus 28 to optionally increase the temperature of the baked stuffed panini (not shown), to optionally increase the moisture content, sheen and crust formed at the surface of the baking stuffed panini, and to optionally gelatinize the flour component(s) of the baking stuffed panini. Oversteaming of the product will cause the product to toughen.

Figure 3:
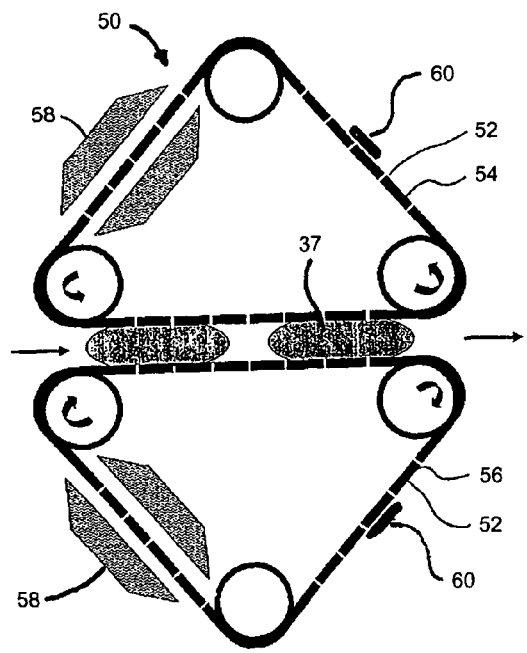
FIG. 3 is a side view of the grilling apparatus.

The baked stuffed panini 30 is then cooled in a cooling apparatus at 31 to a temperature of about 100-130° F. The cooled stuffed panini 30 is then transferred from the cooling apparatus to an enrobing apparatus at 32, as depicted in FIG. 1. Any standard enrobing apparatus may be used to perform the enrobing function. In the enrobing apparatus, optional additives, such as liquid oil, may be applied to the surface of the baked stuffed panini 30 via liquid sprays, brush-coating, roller-coating, dip-coating, immersing, submerging, or the like. Preferably, olive oil is applied to the surface of the cooled stuffed panini 33 in the enrobing apparatus. Such an additive allows the final product to enjoy a longer exterior shelf life. An additive, such as oil, helps to protect the product from freezer burn. Further, an additive, such as oil, contributes to a better tasting product with a desirable sheen on the crust. After the cooled stuffed panini 33 is enrobed, the product may be grilled in a grilling apparatus at 35 to impress grill marks, forming a grilled stuffed panini 37. Traditional grilling techniques may be used. However, the preferred grilling apparatus 50 is shown in FIG. 3.

The grilling apparatus 50 includes at least one heated element 52 on at least one of a first belt 54 and a second belt 56. Preferably multiple evenly spaced heated elements 52 are provided. The heated elements 52 may be wires or bars arranged on at least one of the belts 54, 56. The heated elements 52 preferably are arranged longitudinally and parallel on the belt, but may be arranged in any desired direction and pattern on the belt. The heated elements may also be segmented shapes arranged on the belt. If longitudinally arranged wires are used as the heated elements 52, it is the wires themselves that define the belt without any need for further supporting and connecting structure between the wires.

A portion of each of the two belts 54, 56 are arranged parallel to each other, between which the enrobed stuffed panini 37 passes as the belts continuously traverse around a set of rollers. Preferably the heated elements 52 are located on, or comprise, each belt 54, 56 to form grill marks on both sides of the food product. The heated elements 52 impress into the outer dough of the food product and brown those impressed areas of dough.

Before coming in contact with the dough, the heated elements 52 are elevated in temperature by a heater 58. Heat input by the heater 58 is controlled by a temperature sensor 60. Preferably, the temperature of the heated elements 52 is maintained at about 500° F. This temperature is substantially lower than most typical grilling devices, and browns the dough instead of charring the dough which can leave an undesirable taste on the food product. The lower temperature of the heated elements 52 also allows for Teflon® and other types of release coatings to be used on the heated elements 52 to prevent sticking of the food product thereon.

Any number of grill marks may be formed on the food product. However, preferably, about seven linear and parallel grill marks are formed on a 4.5 inch diameter panini, and about three linear and parallel grill marks are formed on a 2 inch diameter panini.

The grilled stuffed panini 37 is then transferred from the grilling apparatus to a freezing apparatus that reduces the temperature of the grilled stuffed panini 37 to form a frozen stuffed panini 38. The grilled stuffed panini 34 is frozen at 36 before packaging at 40 to ensure that there is no moisture trapped in the package after packaging occurs. However, after the grilled stuffed panini 37 is frozen at 36, it is desirable that wrapping or packaging of the frozen stuffed panini 38 occurs rather quickly. If the frozen stuffed panini 38 is frozen at 36 for too long without wrapping at 40, the frozen stuffed panini 38 may experience freezer burn. In general, any conventional apparatus and technique that is suitable for freezing a bread product, such as the use of a static ammonia freezer, continues freezer, nitrogen tunnel, spiral freezer, or automated in-line freezer may be used to reduce the temperature of the grilled stuffed panini 37 to form a frozen stuffed panini 38. For instance, one type of suitable freezer is an ammonia freezer, such as a Northfield spiral freezer. The temperature of the grilled stuffed panini 37 may be rapidly reduced in a suitable freezer to a temperature of less than about 20° F., resulting in an overall freezing time before packaging of about one hour.

To prepare the frozen stuffed panini 38 for consumption, a consumer may heat the frozen stuffed panini 38 in any suitable heating apparatus, such as a microwave oven, conventional oven, or toaster oven.

Although the present invention has been described with reference to preferred embodiments, workers skilled in the art will recognize that numerous changes may be made in form and detail without departing from the spirit and scope of the invention.

The invention claimed is:

1. A method of manufacturing a filled product comprising the steps of:

co-extruding an uncooked bread dough and a filling from an extruder onto a forming surface to preform the extruded bread dough and filling into a flattened-circular shape or flattened-oval shape, wherein the filling is extruded within the bread dough;

pinching off the, extruded bread dough and filling into discrete units such that the filling is encased by the bread dough;

shaping the discrete units into a flattened shape;

proofing and baking the discrete units of formed dough product; and forming grill marks by way of a grill mark forming means comprising at least a first belt means and a second belt means on at least one side of the filled bread dough product in a continuous or substantially continuous process in conjunction with said co-extruding, and forming the dough product.

2. The method of claim 1, wherein shaping the discrete units is performed by passing each discrete unit between two converging surfaces, moving at substantially the same speed relative one another at a closest point of contact.

3. The method of claim 2, wherein said two converging surfaces are at least one of a roller and a conveyor belt.

4. The method of claim 1, wherein shaping the discrete units is at least partially performed by locating a discharge end of the extruder in close proximity to a forming surface so that co-extruded dough and filling is extruded in a lateral direction between the discharge end of the extruder and the forming surface, forming said flattened shape.

5. The method of claim 1, wherein forming the grill marks is performed by passing the bread dough product between a parallel portion of two belts moving at substantially the same speed and direction, at least one of the belts including at least one heated element that impresses a grill mark into the bread dough product.

6. The method of claim 5, wherein multiple, evenly spaced heated elements are provided on the belt in a longitudinal direction.

7. The method of claim 5, wherein said at lest one heated element is at least one of a wire, a bar and a shape segment.

8. The method of claim 5, wherein said at least one heated element is heated to a temperature of about 500° F.

9. The method of claim 1, wherein pinching off the extruded bread dough and filling into discrete units is performed by a shutter adjustment on the extruder which pushes the filling away from the edges of the bread dough and pinches the edges of the bread dough together to form a closed, filled bread dough.

10. The method of claim 1, further comprising the steps of:
proofing the filled bread dough product; and
baking the filled bread dough product.

11. The method of claim 10, further comprising the steps of cooling the filled bread dough product after baking;
enrobing the filled bread dough product with an oil component;
freezing the filled bread dough product; and
packaging the filled bread dough product.

12. The method of claim 1, wherein the filled bread dough product is shaped in the form of a round panini.

* * * * *